United States Patent
Hirabayashi

(10) Patent No.: US 6,821,064 B2
(45) Date of Patent: Nov. 23, 2004

(54) APPARATUS FOR COMPENSATING POSITION ERRORS OF SPINDLE HEAD AND MACHINE TOOL PROVIDED WITH SAME

(75) Inventor: Katsumi Hirabayashi, Shizuoka-Ken (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 240 days.

(21) Appl. No.: 10/254,605

(22) Filed: Sep. 26, 2002

(65) Prior Publication Data

US 2003/0063957 A1 Apr. 3, 2003

(30) Foreign Application Priority Data

Sep. 28, 2001 (JP) ........................................ 2001-301414

(51) Int. Cl.[7] .............................................. B23Q 15/18
(52) U.S. Cl. ........................ 409/238; 237/239; 700/193
(58) Field of Search ................................ 409/237, 238, 409/239, 186, 187, 193, 194, 207, 208, 190, 191; 700/176, 279; 408/234, 235

(56) References Cited

U.S. PATENT DOCUMENTS

| | | | | |
|---|---|---|---|---|
| 3,129,641 A | * | 4/1964 | Walter | 409/238 |
| 3,684,395 A | * | 8/1972 | Nurakami | 409/237 |
| 3,761,194 A | * | 9/1973 | Wagner | 408/234 |
| 3,988,965 A | * | 11/1976 | Cayen et al. | 409/237 |
| 4,775,926 A | * | 10/1988 | Hasegawa et al. | 700/193 |
| 5,214,592 A | * | 5/1993 | Serizawa et al. | 409/238 |
| 5,482,416 A | * | 1/1996 | Reko | 409/238 |
| 5,662,568 A | * | 9/1997 | Lindem | 409/235 |
| 5,808,888 A | * | 9/1998 | Susnjara et al. | 700/195 |
| 6,161,995 A | * | 12/2000 | Wakazono et al. | 409/191 |
| 6,325,578 B1 | * | 12/2001 | Szuba et al. | 409/238 |
| 6,508,614 B1 | * | 1/2003 | Ozaki et al. | 409/231 |
| 6,519,823 B1 | * | 2/2003 | Sugata et al. | 409/235 |

OTHER PUBLICATIONS

Tool and Manufacturing Engineers Handbook, vol. 1, Machining, Copyright 1983, pp. 10–19.*

* cited by examiner

Primary Examiner—A. L. Wellington
Assistant Examiner—Dana Ross
(74) Attorney, Agent, or Firm—Pillsbury Winthrop LLP

(57) ABSTRACT

An apparatus for compensating position error of a spindle head, comprises: Y-axis control parts 32a, 32b for controlling first and second servomotors 24a, 24b on the basis of a spindle head moving command fed from a numerical control unit 30; a correction data storage part 36 for storing correction data determining the relationship of a feed distance of a ram 18 to a compensation value for correcting the vertical deviation of the ram 18 in the feed distance of the ram 18; and a correction means 44 for being introduced a ram feed instruction, which is fed from the numerical control unit, and for reading out compensation value corresponding to the feed distance of the ram from the correction data storage unit 36, to correct the spindlehead feed instruction by adding or subtracting the compensation value to or from the spindlehead feed instruction.

4 Claims, 4 Drawing Sheets

Apparatus for Compensating Position Errors of Spindle Head and Machine Tool Provided With Same

BACKGROUND OF THE INVENTION

1. Field of the Invention

The present invention generally relates to a numerically controlled machine tool, such as a horizontal boring machine. More specifically, the invention relates to an apparatus for compensating position errors resulting from fluctuation of the center of gravity caused by the horizontal movement of a ram carried by a spindle head.

2. Description of the Prior Art

In a typical horizontal boring machine, a spindle head moves in the vertical direction along a guided on a column, and a ram carried by the spindle head moves in the horizontal directions. If the ram moves in the horizontal direction, there is caused a phenomenon that the spindle head is inclined by the variation of the center of gravity. In the case of a large-sized horizontal boring machine, the ram itself carries heavy weight, so that the position of the center of gravity in the spindle head when the ram does not move is greatly different from that when the ram is fed to the end. By this position fluctuation of the center of gravity, the ram can not keep the straightness during the horizontal movement, so that position errors of the spindle at the front end of the ram in vertical directions are arose. Therefore, it is required to carry out any compensation in order to insure machining precision.

As a conventional method for compensating the position error due to changes of center of gravity, there is known a method for automatically hydraulically changing a rate of lifting forces of right and left two wires for supporting the weight of a spindle head, to hold the straightness of a ram during the horizontal movement.

However, the hydraulic compensation for position fluctuation of the center of gravity is restricted by a hydraulic system which has a response lag and a bad follow-up performance, so that the actual position of the front end of the spindle is different from the corrected position thereof.

SUMMARY OF THE INVENTION

It is therefore an object of the present invention to eliminate the aforementioned problems and to provide an apparatus for compensating position errors of the spindle head resulting from the position fluctuation of the center of gravity in a spindle head, which is capable of responsively and precisely keep the straightness of a movable member such as a ram during the horizontal movement even if the position of the center of gravity is changed with the feeding of the movable member.

In order to accomplish the aforementioned and other objects, there is provided a compensator for compensating a vertical deviation of the movable member resulting from the fluctuation of the center of gravity of the spindle head caused by the feed motion of the movable member, said compensator comprising a Y-axis control means for controlling the first and second Y-axis servomotors on the basis of spindle-head feed instructions provided from the numerical control unit, a Z-axis control means for controlling the Z-axis servomotors on the basis of a movable member feed instruction provided from the numerical control unit; correction data storage means for storing correction data determining the relationship of a feed distance of the movable member to a compensation value for correcting a vertical deviation of the movable member; and correction means for being introduced the movable member feed instruction provided from the numerical control unit, and for reading out the compensation value corresponding to the feed distance of the movable member from the correction data storage means, to correct the spindlehead feed instruction by adding or subtracting the compensation value to or from the spindlehead feed instruction.

According to the present invention, the first servomotor rotates the ball screw by a larger amount than that corresponding to the spindle moving command before correction, to move the spindle head upward, and the second servomotor rotates the ball screw by a smaller amount than that corresponding to the spindle moving command before correction, to move the spindle head downwards, so that the attitude of the spindle head is maintained to be horizontal as a whole. Thus, the guide face of the ram is held so as to be horizontal, so that it is possible to prevent errors from being caused at the position of the tip of the ram (main spindle).

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, a preferred embodiment of an apparatus for compensating position errors of a spindle head according to the present invention will be described below.

Figure 1:
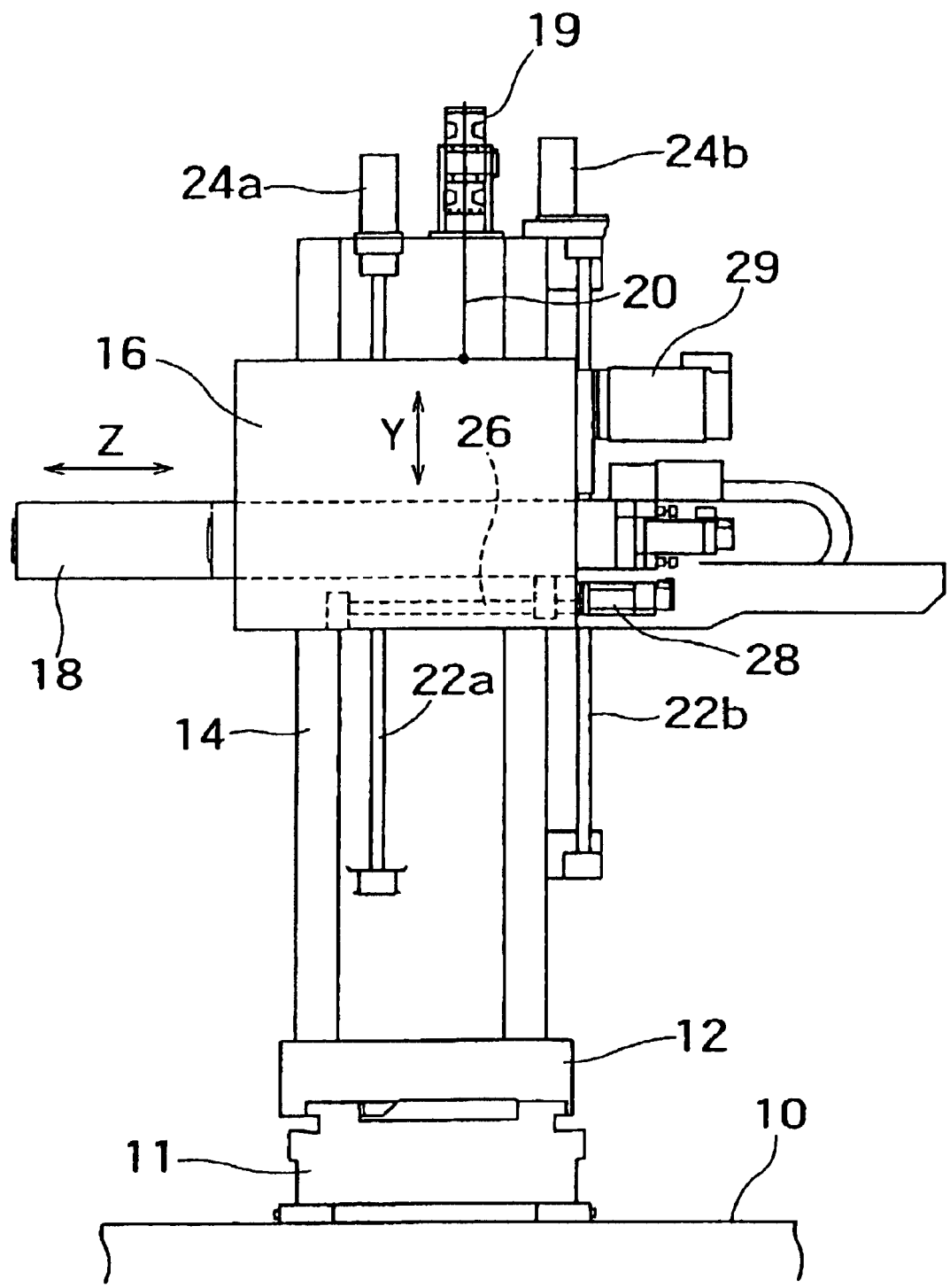
FIG. 1 is a schematic diagram for explaining the construction of a horizontal boring machine to which a compensator according to the present invention is applied.

FIG. 1 shows a numerically controlled (NC) horizontal boring machine to which the present invention is applied. Reference number 10 denotes a floor. On the face of the floor 10, a bed 11 is fixed. On the bed 11, a column base 12 capable of moving along a guide in directions perpendicular to the plane of the figure is mounted. On the column base 12, a column 14 is mounted fixedly.

On the side face of the column 14, a guide face (not shown) for guiding the vertical movement of the spindle head 16 is provided. The spindle head 16 is mounted on the column 14 so as to be movable along the guide face in the vertical direction. In the spindle head 16, a ram 18 is carried so as to be movable in the horizontal direction. A spindle unit is built in the ram 18. In this preferred embodiment, a closed type guide face for guiding four faces of the box-shaped ram 18 is adopted as the guide face of the spindle head 16. Thus, structural rigidity of the spindle head 16 is increased.

On the top of the column 14, a pulley 19 for a counterweight is installed. One end portion of a wire 20 wound onto the pulley 19 is connected to the spindle head 16, and the other end portion of the wire 20 is connected to a counterweight (not shown) so as to balance against the weight of the spindle head 16.

In this horizontal boring machine, the vertical movement of the spindle head 16 is carried out by first and second screw mechanisms comprising two ball screws 22a and 22b, and first and second Y-axis servomotors 24a and 24b for driving the screw mechanisms, respectively. The feeding of the ram 18 is carried out by driving a ball screw mechanism 26 by a ram feed (Z-axis) servomotor 28. Furthermore, reference number 29 denotes a motor for rotating the spindle. When this horizontal boring machine is numerically controlled by the NC unit, an axis for controlling the feed motion of the spindle head 16 is Y-axis, and an axis for controlling the feed motion of the ram 18 is Z-axis.

Figure 2:
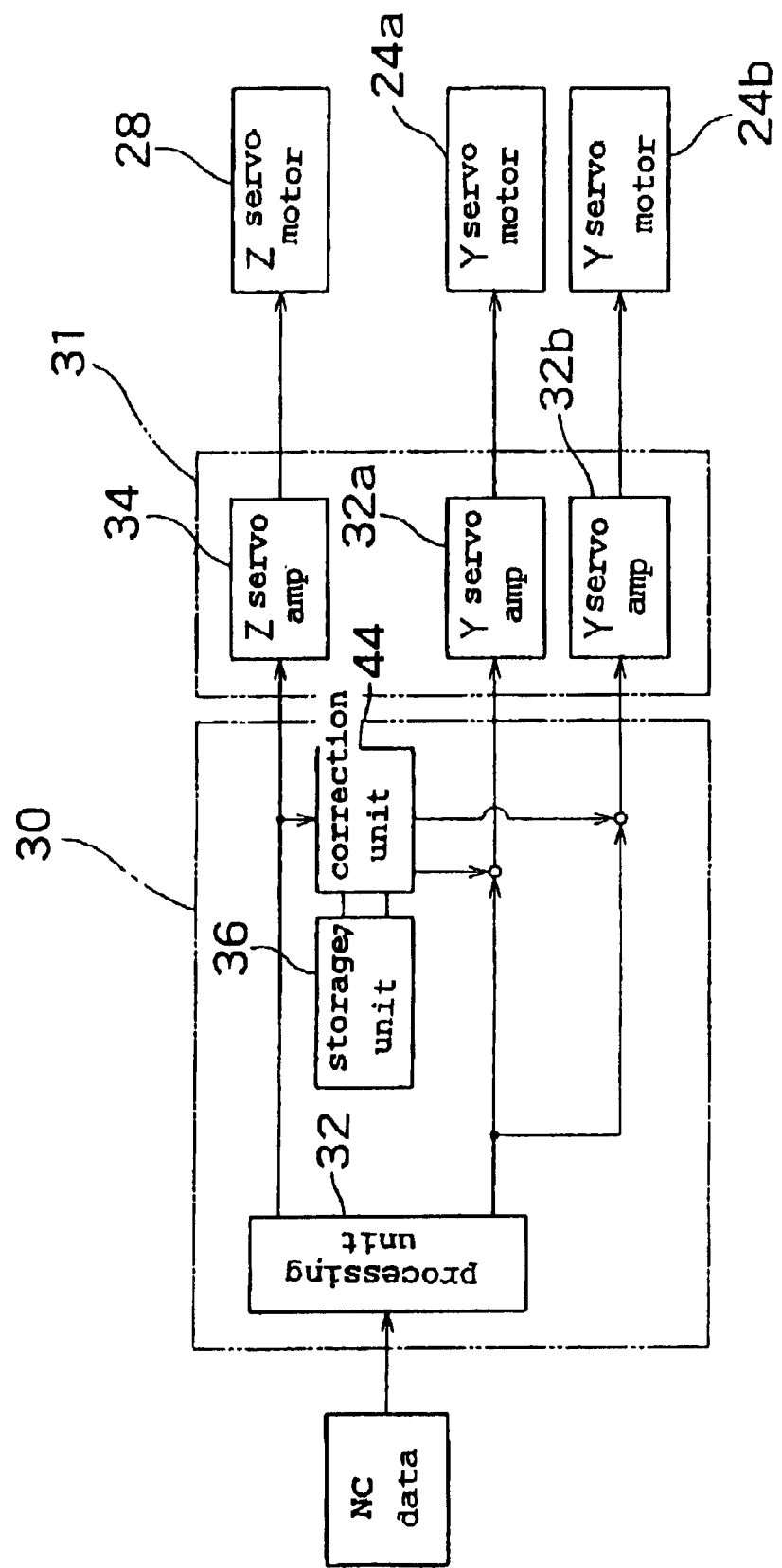
FIG. 2 is a block diagram of the compensator according to the present invention.

In the spindle head 16, when the ram 18 is fed forward and backward, the position of the center of gravity in the spindle head 16 is changed according to the position of the ram 18, so that the guide face of the ram 18 is slightly inclined from the horizontal plane together with spindle head 16. By this inclination of the guide face, the position of the front end of the ram 18 (main spindle) is deviated in a vertical direction from the position when the guide face of the ram 18 is maintained to be horizontal. FIG. 2 is a block diagram of a control unit for compensating such deviation of the ram.

In FIG. 2, reference number 30 denotes an NC unit for numerically controlling a horizontal boring machine. This NC unit 30 has an processing unit 32 for analyzing inputted NC data to generate instructions. A spindlehead feed instruction (Y-axis feed instruction) indicative of the position of the spindle head 16 and ram feed instruction (Z-axis feed instruction) indicative of the position of the ram 18 outputted from the NC unit 30 are provided to Y-axis and Z-axis servo amplifiers 32a and 32b of a servo control unit 31, respectively. Furthermore, control loops for feedback controlling positions and servo amplifiers belonging to other axes are omitted since they are not related directly to the correction of the center of gravity.

The spindlehead feed instruction outputted from the NC unit 30 is introduced to each of the Y-axis serve amplifiers 32a and 32b. On the basis of this spindlehead feed instructions, the Y-axis servo amplifiers 32a and 32b give command signal to and control the position of the servomotors 24a and 24b for driving the spindle head 16 in the vertical direction. Similarly, the ram feed instruction outputted from the NC unit 30 is introduced to a Z-axis servo amplifier 34. On the basis of this ram feed instruction, the Z-axis servo amplifier 34 give command signal to the ram feed servomotor 28 and controls its rotation. Reference number 36 denotes a storage unit in which a correction data table required to carry out compensation is stored.

The correction data table required to carry out the compensation for the position errors will be described below.

This correction data table comprises correction data which determine the relationship of a given feed distance of the ram 18 to a compensation value for correcting the vertical deviation of the ram 18 in the feed distance of the ram 18.

Figure 3:
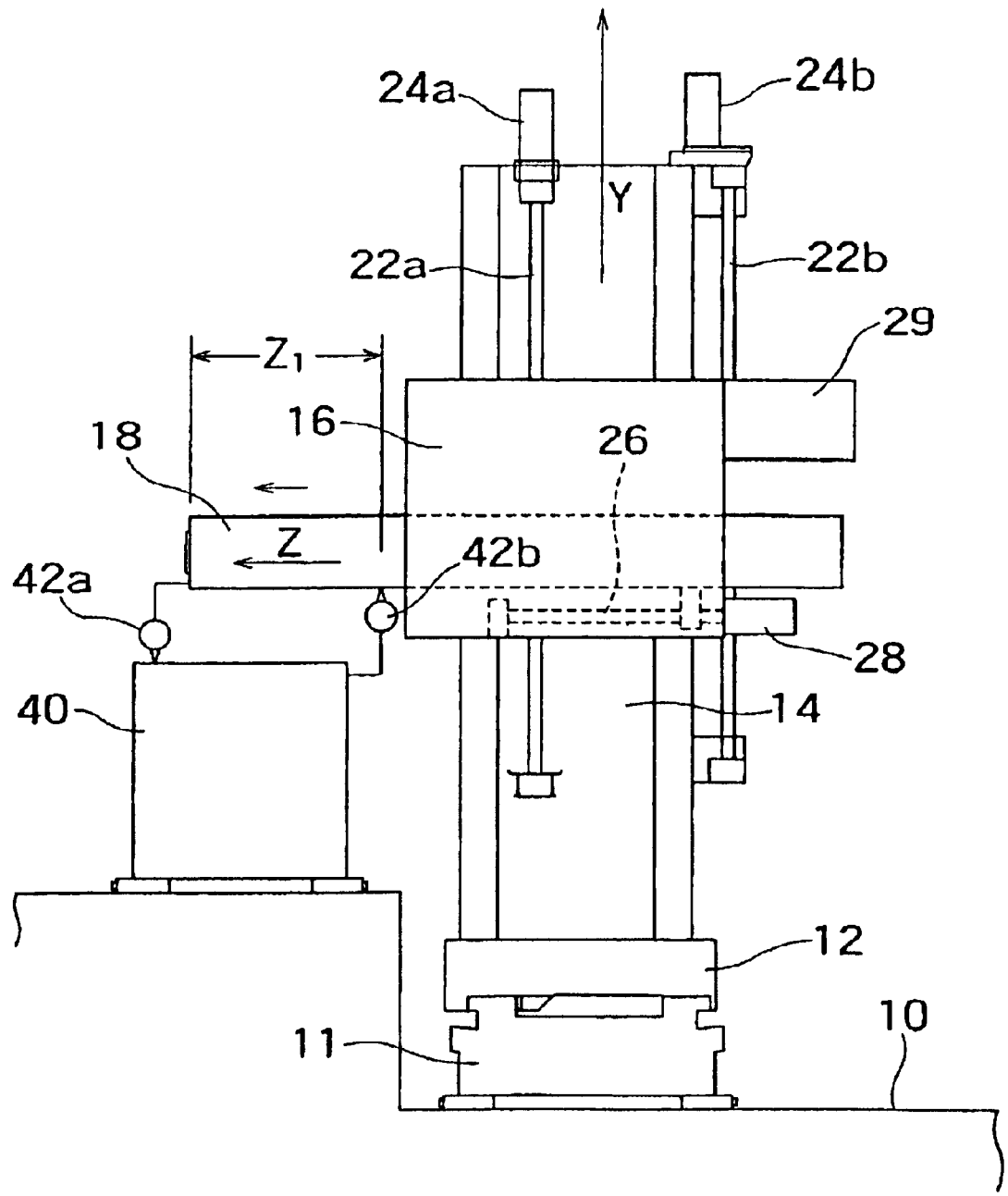
FIG. 3 is a schematic diagram for explaining the measurement of correction data in the horizontal boring machine of FIG. 1.

FIG. 3 is a schematic diagram for explaining the measurement of the vertical deviation of the ram 18 when the ram 18 is moved forward. Reference number 40 denotes a reference block used as a reference of measurement. In this case, a pair of indicators 42a and 42b are used. The indicator 42a is attached to the front end portion of the ram 18, and the other indicator 42b is mounted on the reference block 40. As shown in FIG. 3, when the ram 18 is moved forward by a predetermined distance Z1, the center of gravity is changed by a weight corresponding to the movement of the ram 18, to apply a moment to the spindle head 16, so that the ram 18 is inclined downwards toward front end. At this time, assuming that the vertically upward direction is the positive direction of Y-axis using the top face of the reference block 40 as a horizontal reference, the ram 18 is displaced in the negative direction of Y-axis at the position of the indicator 42a and in the positive direction of Y-axis at the position of the indicator 42b.

When the ram feeding distance is Z1, driving the first and second Y-axis servomotors 24a and 24b count the number of pulses corresponding to an angle of rotation of the first Y-axis servomotor 24a immediately before the indicator 42a having contacted with the top surface of the reference block 42 detached from it, and the number of pulses corresponding to an angle of rotation of the second Y-axis servomotor 24b immediately before the indicator 42b contacts the ram 18, it is possible to measure the compensation value in the ram feed distance Z1.

Figure 4:
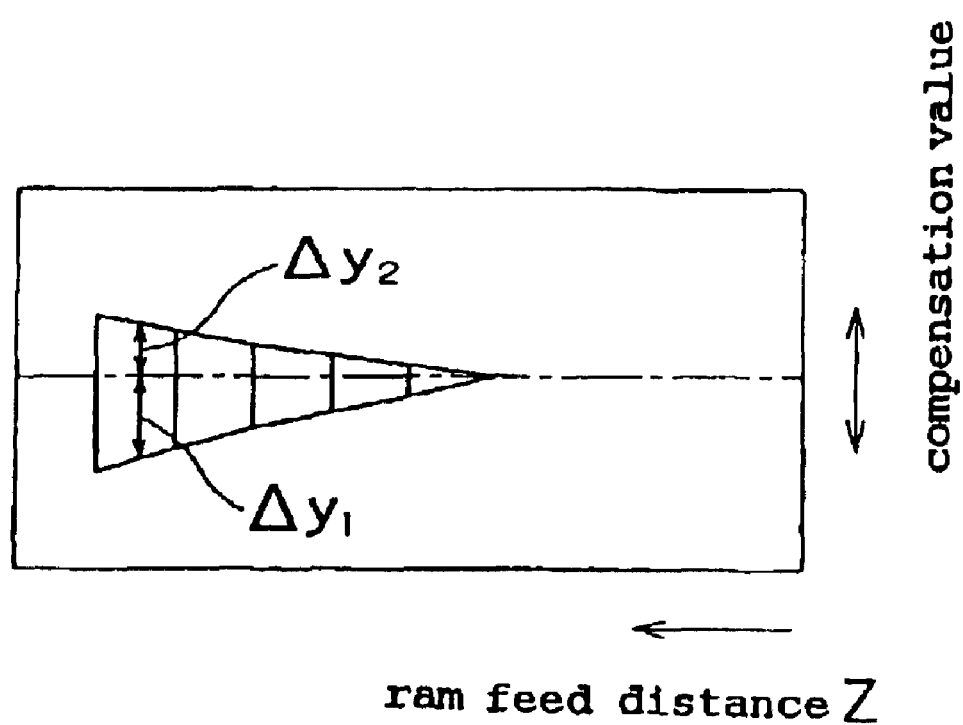
FIG. 4 is a diagram showing an example of a correction data table forming the basis for the correction of the center of gravity of a spindle head.

FIG. 4 is a graph showing the results of such measurements of the compensation value with respect to many different feed distances Z. The correction data used as the correction data table of FIG. 2 is prepared by using data as shown in FIG. 4. Given any feed distance Z of the ram 18 is given, the relationship of the feed distance Z to a compensation value $\Delta y1$ with respect to the first Y-axis servomotor 24a and a compensation value $\Delta y2$ with respect to the second Y-axis servomotor 24b is determined by one to one. In a case where an attachment is attached to the ram 18, it is required to prepare a correction data table beforehand by measuring a renewed compensation value of the ram 18 to which the attachment is attached.

In FIG. 2, reference number 44 denotes a correction processing unit. This correction processing init 44 is designed to introduce a ram feed instruction and read out a compensation value, which corresponds to the feed distance of the ram 18, from the storage unit 36 in which the correction data table is stored. And the correction processing unit is designed to add or subtract the compensation value to or from the spindlehead feed instruction.

That is, if the feed distance of the ram 18 is z, the ram feed instruction is introduced to the correction processing unit 44. Then the correction processing unit 44 read out the compensation values $\Delta y1$ and $\Delta y2$ corresponding to the feed distance z from the correction data table 36. Furthermore, the correction processing unit 44 add the compensation value $\Delta y1$ to the spindlehead feed instruction with respect to the first Y-axis servo amplifier 32a and subtract the compensation value $\Delta y2$ from the spindlehead feed instruction with respect to the second Y-axis servo amplifier 32b.

As a result, the first Y-axis servomotor 22a rotates the ball screw 22a by a larger amount than that corresponding to the spindlehead feed instruction compared with the state where no correction is executed, to move the spindle head 16 upward. And the second Y-axis servomotor 22b rotates the ball screw 22b by a smaller amount than that corresponding to the spindlehead feed instruction command compared with the no correction is executed, to move the spindle head 16 downwards, so that the horizontal position of the spindle head 16 is maintained as a whole. Therefore, the guide face of the ram 18 is held so as to be horizontal, so that it is possible to prevent errors from being caused at the position of the front end of the ram (main spindle).

In addition, the correction value is added or subtract to or from the instruction, which is fed from the NC unit 30, to cause the amounts of rotation of the servomotors 22a and 22b for feeding the spindle head to be different from each other, to correct the fluctuation of the center of gravity of the spindle head 16. Therefore, it is possible to far greatly enhance response than conventional hydraulic systems, so that it is possible to enhance the precision of correction.

As can be clearly seen from the above descriptions, according to the present invention, it is possible to responsively and precisely hold the spindle head in the horizontal position to hold the straightness of the horizontal movement of the ram even if the position of the center of gravity is changed with the feed motion of the ram.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. In a machine tool controlled by a numerical control unit comprising:
    a column;
    a spindle head vertically movable while being guided by a guide on the column;
    a movable member carried by the spindle head so as to be horizontally movable while being guided by a guide on the spindle head;
    a pair of ball screw mechanism for driving vertical feed motion of the spindle head, including first ball screw feed mechanisms disposed on the front side of the movable member and second ball screw feed mechanisms disposed on the rear side of the movable member;
    first servomotor for driving the first ball screw feed mechanism;
    second servomotor for driving the second ball screw feed mechanism;
    a compensator for compensating a vertical deviation of the movable member resulting from the fluctuation of the center of gravity of the spindle head caused by the feed motion of the movable member, said compensator comprising:
        control means for controlling the first and second servomotors on the basis of spindle head feed instructions provided from the numerical control unit;
        correction data storage means for storing correction data determining the relationship of a feed distance of the movable member to a compensation value for correcting a vertical deviation of the movable member; and
        correction means for being introduced a movable member feed instruction provided from the numerical control unit, and for reading out the compensation value corresponding to the feed distance of the movable member from the correction data storage means, to correct the spindle head feed instruction by adding or subtracting the compensation value to or from the spindle head feed instruction.

2. An apparatus according to claim 1, wherein said correction data includes a compensation values $\Delta y1$ indicative of the positive vertical deviation from the horizontal plane at the front end portion of the movable member in a given feed distance of the movable member, and
    a compensation values $\Delta y2$ indicative of the negative vertical deviation from the horizontal plane at the front end of the movable member in the given feed distance of the movable member.

3. An apparatus according to claim 2, wherein said compensation value $\Delta y1$ is added to the spindle head feed instruction being provided to the first servomotor, and said compensation value $\Delta y2$ is subtracted from the spindle head feed instruction being provided to the second servomotor, so that the spindle head feed instruction is corrected.

4. A machine tool controlled by a numerical control unit comprising:
    a column;
    a spindle head vertically movable while being guided by a guide on the column;
    a ram carried by the spindle head so as to be horizontally movable while being guided by a guide on the spindle head;
    a pair of ball screw mechanism for driving vertical feed motion of the spindle head, including first ball screw feed mechanisms disposed on the front side of the ram and second ball screw feed mechanisms disposed on the rear side of the ram;
    a Z-axis ball screw mechanism for driving horizontal feed motion of the ram;
    a Z-axis servomotor for driving the Z-axis ball screw mechanism;
    first Y-axis servomotor for driving the first ball screw feed mechanism;
    second Y-axis servomotor for driving the second ball screw feed mechanism;
    a compensator for compensating a vertical deviation of the ram resulting from the fluctuation of the center of gravity of the spindle head caused by the feed motion of the ram, wherein said compensator comprises:
        a Y-axis control means for controlling the first and second Y-axis servomotors on the basis of spindle head fee instructions provided from the numerical control unit;
        a Z-axis control means for controlling the Z-axis servomotors on the basis of a ram feed instruction provided from the numerical control unit;
        correction data storage means for storing correction data determining the relationship of a feed distance of the ram to a compensation value for correcting a vertical deviation of the ram; and
        correction means for being introduced the ram feed instruction provided from the numerical control unit, and for reading out the compensation value corresponding to the feed distance of the ram from the correction data storage means, to correct the spindle head feed instruction by adding or subtracting the compensation value to or from the spindle head feed instruction.

* * * * *